United States Patent
Kim et al.

(10) Patent No.: US 6,947,494 B2
(45) Date of Patent: Sep. 20, 2005

(54) BIT RATE CONTROL APPARATUS AND METHOD OF OPTICAL RECEIVER

(75) Inventors: Chan-Youl Kim, Bucheon-shi (KR); Yun-Je Oh, Suwon-shi (KR); Tae-Sung Park, Suwon-shi (KR); Jeong-Seok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 756 days.

(21) Appl. No.: 09/945,896

(22) Filed: Sep. 4, 2001

(65) Prior Publication Data

US 2002/0039040 A1 Apr. 4, 2002

(30) Foreign Application Priority Data

Sep. 5, 2000 (KR) .......................................... 2000-52475

(51) Int. Cl.[7] ................................................ H03K 9/00
(52) U.S. Cl. .................. 375/316; 327/165; 370/395.62; 375/376; 375/395; 398/36; 398/155; 398/175
(58) Field of Search ..................... 327/165; 370/395.62; 375/316, 376, 395; 398/36, 155, 175

(56) References Cited

U.S. PATENT DOCUMENTS

| | | | |
|---|---|---|---|
| 5,138,633 A | | 8/1992 | Cortese ....................... 375/106 |
| 5,631,925 A | * | 5/1997 | Koenzen ...................... 375/225 |
| 6,580,263 B2 | * | 6/2003 | Choi et al. ..................... 324/96 |
| 2002/0021767 A1 | * | 2/2002 | Greiss et al. ................. 375/316 |
| 2002/0039040 A1 | * | 4/2002 | Kim et al. .................... 327/165 |
| 2004/0096013 A1 | * | 5/2004 | Laturell et al. .............. 375/316 |

FOREIGN PATENT DOCUMENTS

| | | | |
|---|---|---|---|
| EP | 0 342 010 A2 | 11/1989 | ............ H04L/25/52 |
| EP | 0 580 317 A1 | 1/1994 | ............ H04B/10/14 |
| EP | 0 878 926 A2 | 11/1998 | ......... H04B/10/158 |
| EP | 0 910 192 A2 | 4/1999 | ............. H04L/7/00 |

OTHER PUBLICATIONS

Jae Ho Song et al., "Design and Characterization of a 10 Gb/s Clock and Data Recovery Circuit Implemented with Phase–Locked Loop", ETRI Journal, vol. 21, No. 3, Sep. 1999, pp. 1–5.

* cited by examiner

Primary Examiner—Stephen Chin
Assistant Examiner—Erin M. File
(74) Attorney, Agent, or Firm—Cha & Reiter L.L.C.

(57) ABSTRACT

A bit rate control apparatus having a delay unit for delaying an input signal received in an optical receiver in an optoelectrically-converted state; a DC level outputting unit for exclusively OR'ing the input signal with the delayed signal outputted from the delay unit; an A/D converting unit for A/D converting a DC level outputted from the DC level outputting unit; a clock/data reproducing unit for reproducing clocks and data based on a bit rate control signal; and a control unit for calculating a variation in the DC level at every interruption timing, which is previously set, based on the A/D converted signal, and for determining whether the DC level variation occurs under the influence of temperature or due to a variation in bit rate based on a difference between the calculated DC level variation from a predetermined variation limit.

7 Claims, 2 Drawing Sheets

BIT RATE CONTROL APPARATUS AND METHOD OF OPTICAL RECEIVER

CLAIM OF PRIORITY

This application makes reference to and claims all benefits accruing under 35 U.S.C. Section 119 from an application entitled, "BIT RATE CONTROL APPARATUS AND METHOD OF OPTICAL RECEIVER," filed in Korean Industrial Property Office on Sep. 5, 2000, and there duly assigned Ser. No. 00-52475.

BACKGROUND OF THE INVENTION

1. Field of the Invention

The present invention relates to optical communication systems, and more particularly to the optical receiver of an optical cross-connect device.

2. Description of the Related Art

In an optical communication system, an optical cross-connect device is typically installed at an intermediate node connecting together the upper node, such as a central base station, and the lower node, such as a subscriber. In addition to the basic functions of transferring and allocating channel signals, the optical cross-connect device plays viable functions of optimizing the data traffic in an optical network and the growth of the network, while improving the abnormal congestion and survivability of the network. In particular, an optical cross-connect device is used in a wavelength division multiplexing (WDM) system and typically includes a demultiplexer, an optical receiver, a cross-connect switch, a controller, an optical transmitter, and a multiplexer.

A conventional receiver in a multi-channel optical communication system typically operates at a particular predetermined bit rate. Hence, the receiver is bit-rate specific. There are diverse transfer formats, known as "protocols," that are available in optical communication systems. For example, representative transfer formats include SDH/SONET (Synchronous Digital Hierarchy/Synchronous Optical NETwork), FDDI (Fiber Distributed Data Interface), ESCON (Enterprise Systems CONnectivity), optical fiber channel, gigabit Ethernet, and ATM (Asynchronous Transfer Mode). These different protocols provide diverse bit rates of 125 Mb/s, 155 Mb/s, 200 Mb/s, 622 Mb/s, 1,062 Mb/s, 1.25 Gb/s, and 2.5 Gb/s, respectively.

The conventional optical receivers are typically provided with a programmable clock/data reproducing circuit to accommodate different bit rates. The programmable clock/data reproducing circuit reproduces the data and clocks of an input optical signal which is based on a reference clock that is determined on the bit rate of the input optical signal, which is discriminated from a DC level generated based on the respective amplified and delayed from the input optical signal. However, the conventional optical receivers have disadvantages in that there may be an erroneous bit rate determination to data due to the influence of temperature on the circuits for amplifying and delaying the input optical signal, thereby resulting in a degradation in the reliability of the associated optical receiver.

SUMMARY OF THE INVENTION

The present invention is directed to provide a bit rate control apparatus and method for an optical receiver, which is capable of avoiding an erroneous determination of the bit rate occurring under the influence of temperature.

In accordance with one aspect, the present invention provides a bit rate control apparatus for an optical receiver which includes:

a delay unit for delaying an input signal received in the optical receiver in an optoelectrically-converted state;

a DC level outputting unit for exclusively OR'ing the input signal with the delayed signal outputted from the delay unit and outputting a signal obtained after the exclusive OR'ing in the form of a DC level;

an A/D converting unit for A/D converting the DC level outputted from the DC level outputting unit;

a clock/data reproducing unit for receiving the input signal and reproducing clocks and data based on a bit rate control signal; and, a control unit for calculating a variation in the DC level at every interrupt timing, which is previously set, based on the A/D converted signal, for determining whether the DC level variation occurs under the influence of temperature or due to a variation in bit rate, based on a difference of the calculated DC level variation from a predetermined variation limit, and for outputting a bit rate control signal based on a result of the determination.

In accordance with another aspect, the present invention provides a bit rate control method for an optical receiver of the type having a DC level outputting unit, an A/D converting unit, a clock/data reproducing unit, and a control unit, comprising:

a current DC level detecting step of detecting a current DC level from a signal outputted from the A/D converting unit;

a DC level variation calculating step of calculating, as a DC level variation, a difference between the current DC level detected in the current DC level detecting step and a previous DC level stored preceding the current DC level;

a DC level variation/variation limit comparing step of comparing the DC level variation with a predetermined variation limit;

a bit rate maintaining signal outputting step of maintaining the current bit rate when the DC level variation is not more than the variation limit;

a DC level variation determining step of determining whether the DC level variation is greater than 0 when the DC level variation is not greater than the variation limit; and, a bit rate change signal outputting step of outputting a low-level bit rate change signal when it is determined in the DC level variation determining step that the DC level variation is greater than 0, while outputting a high-level bit rate change signal when it is determined that the DC level variation is not greater than 0.

BRIEF DESCRIPTION OF THE DRAWINGS

The above advantages of the present invention will become more apparent with reference to the attached drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
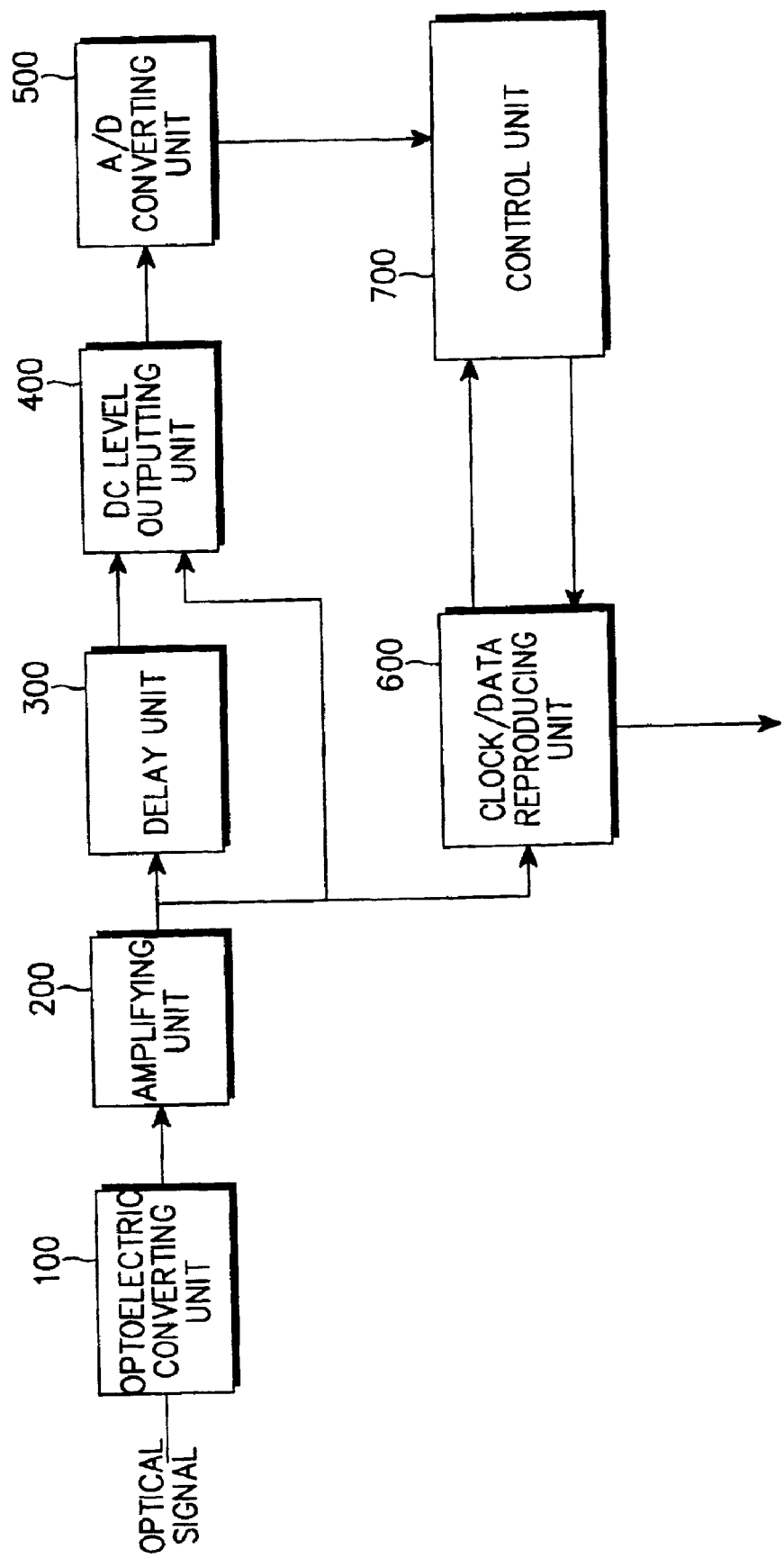
FIG. 1 is a block diagram illustrating the bit rate control apparatus of an optical receiver in accordance with a preferred embodiment of the present invention.

FIG. 1 is a block diagram illustrating a bit rate control apparatus of an optical receiver in accordance with the preferred embodiment of the present invention. As shown in FIG. 1, the optical receiver includes an optoelectric converting unit 100, an amplifying unit 200, a delay unit 300, a DC level outputting unit, an A/D converting unit 500, a clock/data reproducing unit 600, and a control unit 700.

In operation, the optoelectric converting unit 100 converts an input optical signal into an electrical signal. The amplifying unit 200 amplifies the electrical signal outputted from the optoelectric converting unit 100 at a desired amplification rate. The delay unit 300 delays the signal outputted from the amplifying unit 200 by a predetermined delay duration. The DC level outputting unit 400 exclusively OR's the output signal from the amplifying unit 200 with the delayed signal from the delay unit 300, then outputs the resultant signal in the form of a DC level. That is, the DC level outputting unit 400 conducts a low-pass filtering operation for the output signal, generated in accordance with the exclusive ORing, thereby outputting filtered DC signal. The A/D converting unit 500 conducts an A/D conversion for the DC level outputted from the DC level outputting unit 400.

Meanwhile, the clock/data reproducing unit 600 receives the output signal from the amplifying unit 200 and reproduces clocks and data based on a reference clock generated in response to a bit rate control signal outputted from the control unit 700. That is, the clock/data reproducing unit 600 conducts re-shaping, re-generation, and re-timing operations for the signal received therein based on the reference signal supplied thereto. To achieve this, the control unit 700 calculates a variation in the DC level at every interrupt timing, which is previously set, based on the A/D converted signal. Thereafter, the control unit 700 determines, based on a difference between the calculated DC level variation from a predetermined variation limit, whether the DC level variation occurs under the influence of temperature or due to a variation in bit rate. Based on the determination result, the control unit 700 then outputs a corresponding bit rate control signal. When the DC level variation is less than or equal to the predetermined variation limit, the control unit 700 determines the DC level variation occurs under the influence of temperature. On the other hand, where the DC level variation is more than the predetermined variation limit, the control unit 700 determines the DC level variation to result from a variation in bit rate.

Figure 2:
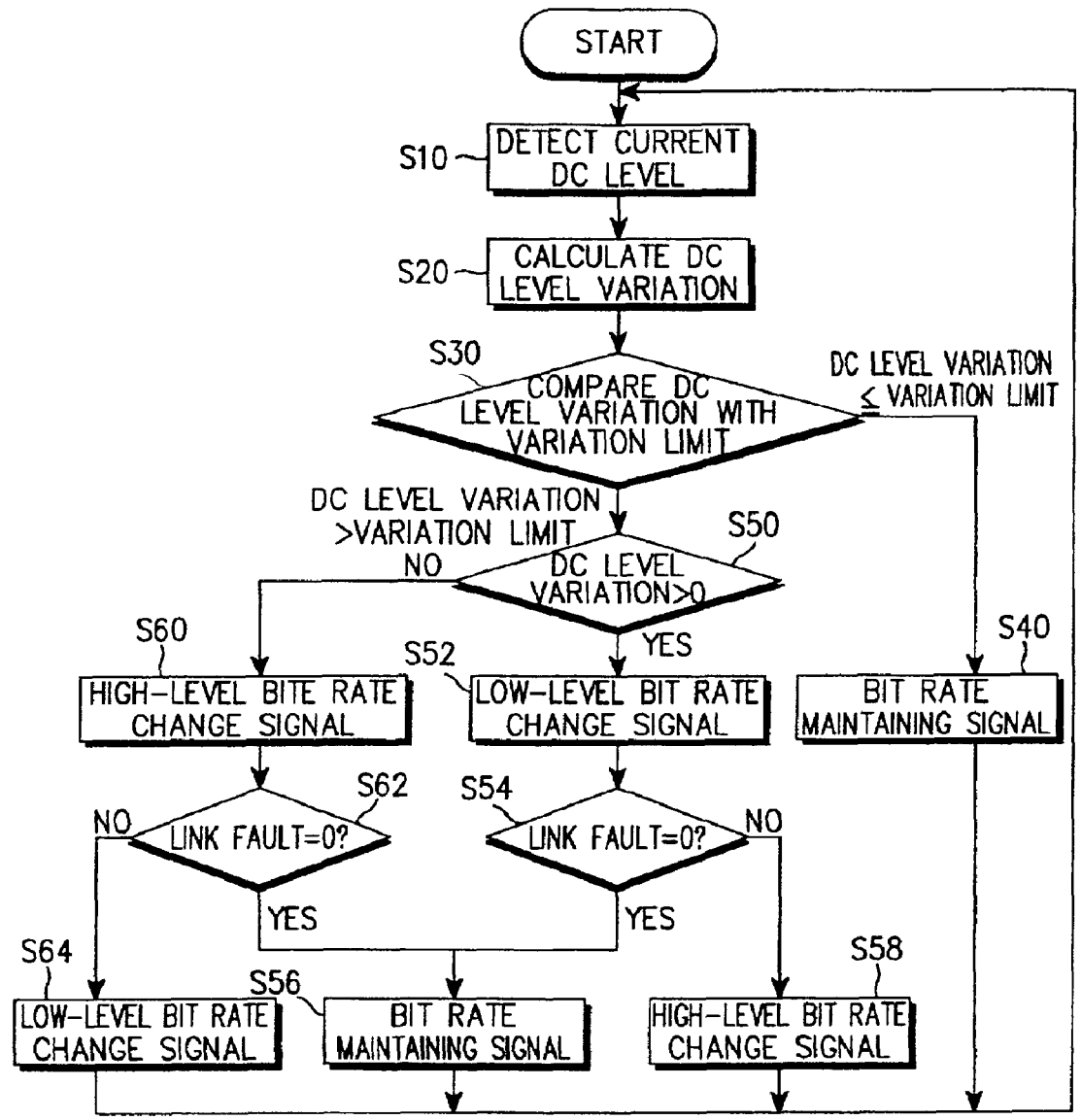
FIG. 2 is a flow chart illustrating the bit rate control method of an optical receiver in accordance with a preferred embodiment of the present invention.

FIG. 2 is a flow chart illustrating the method for controlling the bit rate of an optical receiver in accordance with the preferred embodiment of the present invention. As shown in FIG. 2, the bit rate control method involves a current DC level detecting step (Step S10), a DC level variation calculating step (Step S20), a DC level variation/variation limit comparing step (Step S30), a bit rate maintaining signal outputting step (Step S40), a DC level variation determining step (Step S50), and a bit rate change signal outputting step (S52 and S60).

In the current DC level detecting step S10, the current DC level is detected from the signal outputted from the A/D converting unit 500.

In the DC level variation calculating step S20, the DC level variation is calculated. This calculation is achieved by calculating a difference between the current DC level detected in the current DC level detecting step S10 and a predetermined DC level (hereinafter "predetermined variation limit") that is stored in a memory.

In the DC level variation/variation limit comparing step S30, the DC level variation calculated in step S20 is compared with the predetermined variation limit. The variation limit is used as a reference for determining whether or not the DC level variation occurs under the influence of temperature or due to an actual bit rate variation. This variation limit is determined by taking into consideration, the interrupt timing, the DC level variation occurring under the influence of temperature according to the interrupt timing, and the minimum DC level variation resulting from an actual bit rate variation. For example, where the interrupt timing is set to 0.5 second, the DC level variation occurring under the influence of temperature corresponds to a maximum of 1 digit. In this case, the DC level variation resulting from an actual bit rate variation corresponds to a minimum of 3 digits. Therefore, the variation limit may be set to an intermediate value of 1 digit and 3 digits, that is, 2 digits.

The bit rate maintaining signal outputting step S40 is a step of maintaining the current bit rate when it is determined in the DC level variation/variation limit comparing step S30 that the DC level variation is not more than the variation limit. That is, the DC level variation less than or equal to the variation limit indicates that the DC level variation does not result from an actual bit rate variation, but results from a DC level variation occurring under the influence of temperature. In this case, therefore, a bit rate maintaining signal for maintaining the current bit rate is outputted.

If it is determined in the DC level variation/variation limit comparing step S30 that the DC level variation is more than the variation limit, it is determined in the DC level variation determining step 50 whether or not the DC level variation is greater than 0. When the DC level variation is more than the variation limit, it indicates that the DC level variation results from an actual bit rate variation. In this case, therefore, it is necessary to perform a desired bit rate change. Accordingly, it is determined whether the DC level variation has a positive value or a negative value.

The bit rate change signal outputting step involves step S52 of outputting a low-level bit rate change signal when it is determined that the DC level variation is greater than 0, and outputting a high-level bit rate change signal when it is determined that the DC level variation is less than 0.

Following steps S52 and S60 of outputting low and high-level bit rate change signals, link fault determining steps S54 and S62 are executed, respectively, to determine whether or not there is generated a link fault, that is, a link fault having a zero value based on a PLL (Phase Locked Loop) locking signal from the clock/data reproducing unit 600. If it is determined in either step S54 or S62 that the link fault with a zero value is generated, the procedure then proceeds to step S56 of maintaining the bit rate signal. If not, the procedure proceeds to either the high-level bit rate change signal outputting step S58 or the low-level bit rate change signal outputting step S64.

As apparent from the above description, the present invention provides a bit rate control apparatus for an optical receiver and a method thereof, in which it is determined whether a detected variation in DC level occurs under the influence of temperature or due to an actual variation in bit rate, in order to perform a desired bit rate change operation only when the detected DC level variation results from an actual variation in bit rate. Accordingly, it is possible to avoid an erroneous determination of the bit rate occurring under the influence of temperature, thereby achieving an improvement in the reliability of the optical receiver.

While this invention has been described in connection with what is presently considered to be the most practical and preferred embodiment, it is to be understood that the invention is not limited to the disclosed embodiment, but, on the contrary, it is intended to cover various modifications within the spirit and the scope of the appended claims.

What is claimed is:

1. An apparatus for providing the bit rate control of an optical receiver comprising:
   a delay unit for delaying an input signal received in the optical receiver;
   a DC level unit for exclusively OR'ing the input signal with the delayed signal outputted from the delay unit to output a DC level signal;
   a converting unit for A/D converting the DC level output from the DC level unit;
   a clock/data reproducing unit for receiving the input signal and reproducing clocks and data based on a bit rate control signal; and,
   a control unit for calculating a variation in the DC level at every interrupt timing, previously set, based on the A/D converted signal, for determining whether the DC level variation occurs under the influence of temperature or due to a variation of the bit rate based on a difference between the calculated DC level variation from a predetermined variation limit, and for outputting the bit rate control signal based on the determination result.

2. The apparatus according to claim 1, wherein the DC level unit comprises:
   a calculating unit for exclusively OR'ing the input signal with the delayed signal to generate a bit rate recognizing signal; and,
   a filter for low-pass filtering the bit rate recognizing signal to generate the DC level output to the converting unit.

3. The apparatus according to claim 1, wherein the variation limit is set to 2 digits under a condition in which the interrupt timing is set to 0.5 second.

4. The apparatus according to claim 1, further comprising an optoelectric converting unit for converting the input signal into an electrical signal.

5. The apparatus according to claim 1, further comprising an amplifier for amplifying the converted electrical signal.

6. A method for providing a bit rate control for an optical receiver of the type having a DC level outputting unit, an A/D converting unit, a clock/data reproducing unit, and a control unit, the method comprising the steps of:
   a step of detecting a current DC level from a signal outputted from the A/D converting unit;
   a step of calculating, as a DC level variation, the difference between the current DC level detected in the detecting step and a predetermined DC level;
   a step of comparing the DC level variation with a predetermined variation limit;
   a step of maintaining the current bit rate if the DC level variation is less than the variation limit;
   a step of determining whether the DC level variation is greater than 0 if the DC level variation is less than the variation limit; and,
   a bit rate change step of outputting a low-level bit rate change signal when it is determined in the determining step that the DC level variation is greater than 0, while outputting a high-level bit rate change signal when it is determined that the DC level variation is less than 0.

7. The method according to claim 6, further comprising the step of determining whether there is a link fault based on a locking signal outputted from the clock/data reproducing unit.

* * * * *